United States Patent [19]

Hashimoto et al.

[11] Patent Number: 4,848,657

[45] Date of Patent: Jul. 18, 1989

[54] METHOD OF AND APPARATUS FOR CONTROLLING THE FLOW RATE OF VISCOUS FLUID

[75] Inventors: Hirofumi Hashimoto; Sensuke Hayashi, both of Toyota, Japan

[73] Assignee: Toyota Jidosha Kabushiki Kaisha, Toyota, Japan

[21] Appl. No.: 125,816

[22] Filed: Nov. 23, 1987

Related U.S. Application Data

[63] Continuation of Ser. No. 911,991, Sep. 26, 1986, abandoned.

[30] Foreign Application Priority Data

Sep. 27, 1985 [JP] Japan ................................ 60-214035

[51] Int. Cl.$^4$ ........................ A01G 27/00; B05B 17/04

[52] U.S. Cl. ........................................ 239/11; 239/69; 239/71; 137/8

[58] Field of Search .................... 239/11, DIG. 14, 71, 239/74, 75, 76, 69; 417/18, 32, 45; 60/329; 137/8, 12; 73/861.02–861.03

[56] References Cited

U.S. PATENT DOCUMENTS

| | | | |
|---|---|---|---|
| 3,530,958 | 9/1970 | Brannon et al. | 60/329 X |
| 3,787,882 | 1/1974 | Fillmore et al. | 417/32 X |
| 3,977,603 | 8/1976 | Magee, Jr. | 239/76 |
| 4,585,169 | 4/1986 | Kinsey | 239/75 |
| 4,595,342 | 6/1986 | Christlieb et al. | 417/45 |
| 4,614,300 | 9/1986 | Falcoff | 239/69 X |
| 4,720,801 | 1/1988 | Boll | 239/69 X |

*Primary Examiner*—Andres Kashnikow
*Assistant Examiner*—Patrick N. Burkhart
*Attorney, Agent, or Firm*—Finnegan, Henderson, Farabow, Garrett & Dunner

[57] ABSTRACT

A method and an apparatus for controlling a flow rate of viscous fluid for feeding the fluid under pressure from a pump through a hose to a spray gun with a control unit. A temperature and a pressure of the viscous fluid in the hose is detected. Based on the detected temperature and a temperature-supplying pressure characteristic data stored in the unit, viscous fluid supplying pressure for obtaining a desired set flow rate is calculated. Based on the detected pressure of the fluid and the calculated supplying pressure, a signal for obtaining a desired supplying pressure is obtained and outputted. The gun is switched on to operate the pump at a constant speed to provide the desired set flow rate. Alternatively, only the pressure is detected and a pressure which is obtained in a previous operation and stored in the unit is used.

4 Claims, 6 Drawing Sheets

METHOD OF AND APPARATUS FOR CONTROLLING THE FLOW RATE OF VISCOUS FLUID

This application is a continuation, of application Ser. No. 911/991, filed Sept. 26, 1986, now abandoned.

BACKGROUND OF THE INVENTION

The present invention relates to a method and an apparatus for controlling a flow rate of viscous fluid to feed a predetermined quantity of the fluid in a constant flow rate even if the viscosity of the fluid varies due to temperature.

Heretofore, when highly viscous fluid such as a sealing material for bonding (heretofore referred to as "a sealer") is coated on the seam of panels of an automotive body, the sealer is coated by a spraying equipment such as a robot having an automatic spraying gun. In this case, a nozzle of the gun is moved along the seam of the panels and the gun is switched on or off in response to the necessity of the sealing of the panels. In this case, the sealer of viscous fluid is ordinarily fed by a plunger pump driven by compressed air. The pump is coupled with the gun by a high pressure hose and the sealer is fed under a predetermined pressure.

However, this conventional method has a drawbacks as follows. When an atmospheric temperature varies, the viscosity of the sealer varies so that a pressure loss in the hose and the spraying gun varies. Thus, the injecting flow rate of the sealer varies so that the sealer is not unstably injected. Thus, good sealing quantity can not be obtained.

In order to solve the abovementioned drawbacks, a worker operated a pressure regulator in response to the temperature so as to maintain the flow rate of the sealer. On the other way, proposed was an apparatus for obtaining a constant flow rate of sealer by operating a constant-capacity type pump at a constant speed. When the spraying gun is switched on, it take a long time for the injecting amount of the sealer to reach to the predetermined constant flow rate due to the pressure accumulation of the hose. Also, time to reach a predetermined flow rate varies (approx. ±20%) due to the temperature. Thus, there arises a drawback that the coating width of the sealer does not become stable (in case of 400 to 500 mm or longer of coating distance) when the gun is moved at a high speed (400 to 500 mm/sec.) to perform the sealing work of the panels in a high efficiency.

SUMMARY OF THE INVENTION

Accordingly, an object of the present invention is to provide a method for controlling the flow rate of viscous fluid so as to feed the viscous fluid in a constant flow rate even if the viscosity of the fluid varies due to temperature and to feed the fluid at a stable constant flow rate immediately after the start of injecting the fluid from a spray gun.

Another object of the present invention is to provide an apparatus for controlling the flow rate of viscous fluid so as to feed the fluid in a constant flow rate immediately after the start of injecting the fluid from a spray gun to obtain stable sealing quantity. Said apparatus can be applied to arbitrary viscous fluid having different temperature-viscous characteristic by altering temperature-supplying pressure characteristic data.

In order to solve the abovementioned drawbacks, there is provided according to one aspect of the present invention a method for controlling a flow rate of viscous fluid for feeding the fluid under pressure from a pump through a hose to a spray gun with a control unit, said hose coupling the pump with the gun, said method comprising the steps of: detecting a temperature and a pressure of the viscous fluid in the hose: calculating viscous fluid supplying pressure with the control unit based on the detected temperature and a temperature-supplying pressure characteristic data stored in the unit to obtain a desired flow rate: reading out a signal for obtaining a desired supplying pressure with the unit based on the detected pressure of the fluid and the calculated supplying pressure, outputting the signal to coincide the detected pressure with the desired pressure, and switching on the gun to operate the pump at a constant speed to provide the desired flow rate.

Further, in order to execute the abovementioned method, there is provided according to another aspect of the present invention an apparatus for controlling a flow rate of viscous fluid feeding from a pump through a hose to a spray gun, comprising: a temperature sensor for detecting a temperature of the fluid in the hose, a pressure sensor for detecting a pressure of the fluid in the hose, memory means for storing a temperaturesupplying pressure characteristic data of the fluid, means for calculating viscous fluid supplying pressure based on the detected temperature and the temperature-supplying pressure characteristic data, means for obtaining a signal for obtaining a desired supplying pressure based on the detected pressure and the calculated pressure to coincide the detected pressure with the desired pressure, and means for operating the pump.

According to the above described method, even if the viscosity of the fluid varies due to temperature, a constant flow rate of the fluid can be obtained, and stable constant flow rate can be attained immediately after the spray gun starts injecting the fluid. According to the aforementioned apparatus, a constant flow rate of the fluid can be obtained immediately after the gun starts injecting the fluid. Thus, when the apparatus is applied to a fluid supplying apparatus of an automatic sealing system, a stable sealing quality can be provided, and the abovementioned apparatus can be readily applied, to arbitrary viscous fluid having different temperature-viscosity characteristic by altering the temperature-supplying pressure characteristic data.

In further another aspect of the present invention, there is provided a method for controlling a flow rate of viscous fluid for feeding the fluid under pressure from a pump through a hose to a spray gun with a control unit, said hose coupling the pump with the gun, said method comprising the steps of: reading out a pressure stored in the unit, said pressure being a pressure obtained in a previous operation, detecting a pressure of the viscous fluid in the hose, reading out a signal for obtaining a desired supplying pressure with the unit based on the read out pressure and the detected pressure to coincide the detected pressure with the desired pressure, outputting the signal, switching on the gun to operate the pump at a constant speed to provide the desired flow rate, and storing a pressure to the unit after stabilizing the pressure of the viscous fluid in the hose.

According to still another aspect of the present invention, there is provided an apparatus for controlling a flow rate of viscous fluid feeding from a pump through a hose to a spray gun, comprising: a pressure sensor for detecting a pressure of the viscous fluid in the hose, memory means for storing a pressure detected by the sensor, means for obtaining a signal for obtaining a desired supplying pressure based on a detected pressure and the stored pressure to coincide a detected pressure with the desired pressure, and means for operating the pump.

In the method and apparatus of these another aspect of the invention, since the step or means for detecting the temperature in the first and second aspects is not necessary, the entire construction can be simplified. Also, the steps of storing the temperature-supplying pressure characteristic data is not necessary.

These and other objects and features will become more apparent from the following description of the preferred embodiments of the present invention when read in connection with the accompanying drawings.

DESCRIPTION OF THE PREFERRED EMBODIMENTS

The present invention will be described in detail with reference to embodiments shown in the accompanying drawings.

Figure 1:
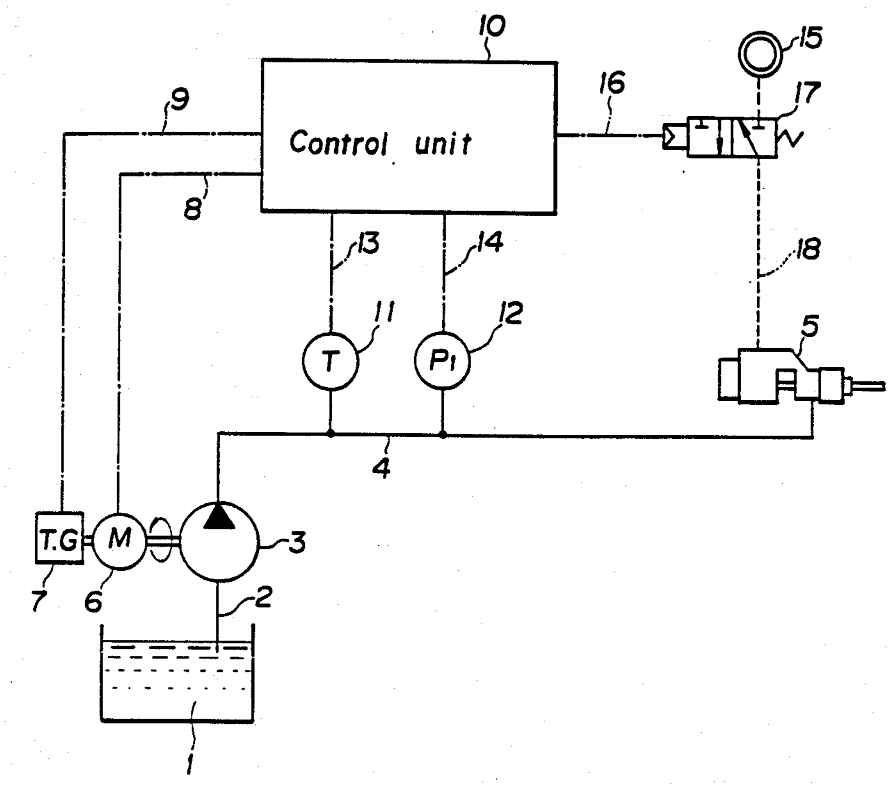
FIG. 1 is a block diagram showing a first embodiment of an apparatus for controlling the flow rate of viscous fluid for executing a method of controlling the flow rate of viscous fluid according to the present invention.

FIG. 1 shows a first embodiment of an apparatus for controlling the flow rate of viscous fluid according to the present invention. A sealer 1 of viscous fluid in a tank is provided through a conduit 2 to a constant-capacity type pump 3, and then supplied under pressure through a hose 4 to a spray gun 5. The pump 3 is driven by a servo motor 6. A speed detector 7 is connected to the motor 6. The motor 6 and the detector 7 are connected to a control unit 10 through wirings 8 and 9. A temperature sensor 11 for detecting the temperature of the sealer in the hose 4 and a pressure sensor 12 for detecting the pressure of the sealer are mounted in the hose 4 to deliver detected signals through wirings 13 and 14 to the control unit 10. The gun 5 actuates a solenoid valve 17 by control signals "ON/OFF" supplied from the control unit 10 through wirings 16, thereby supplying an air pilot signal from an air source 15 through an air hose 18 to the gun 5 so as to switch on or off the gun 5.

Figure 2:
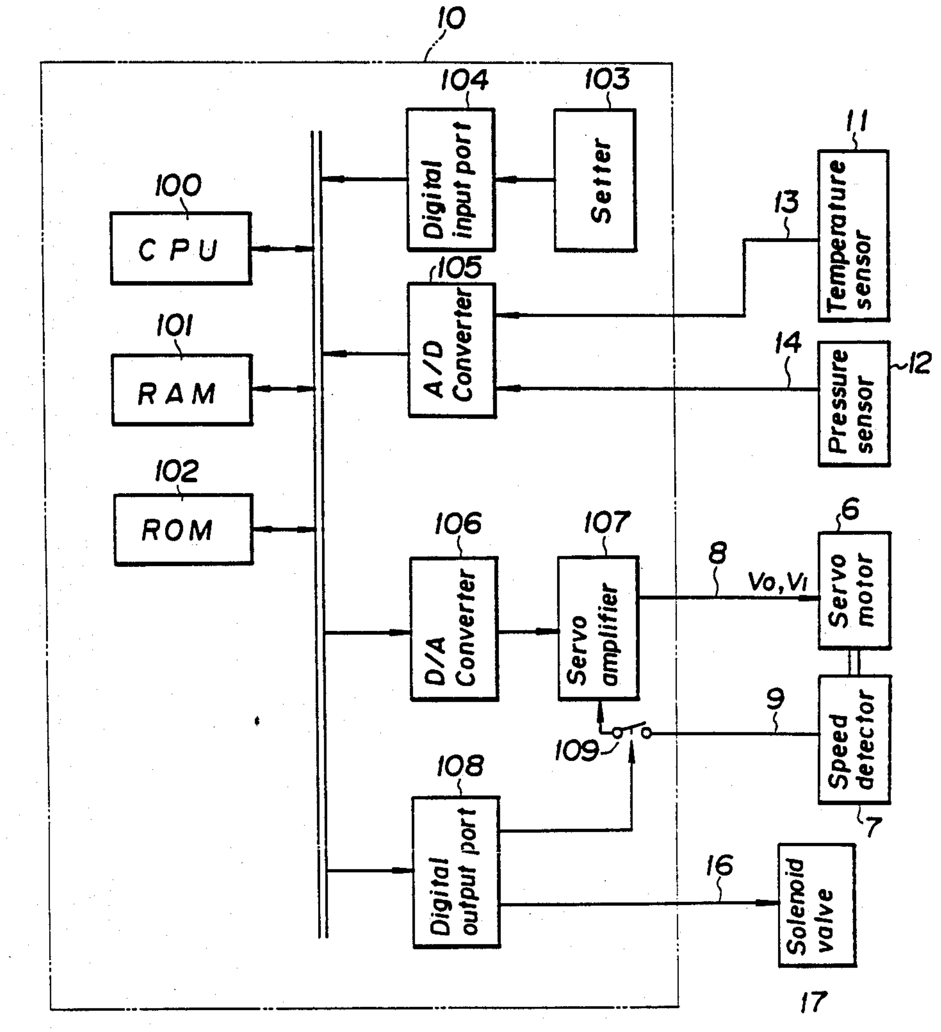
FIG. 2 is a circuit diagram of a control unit in FIG. 1.
Figure 3:
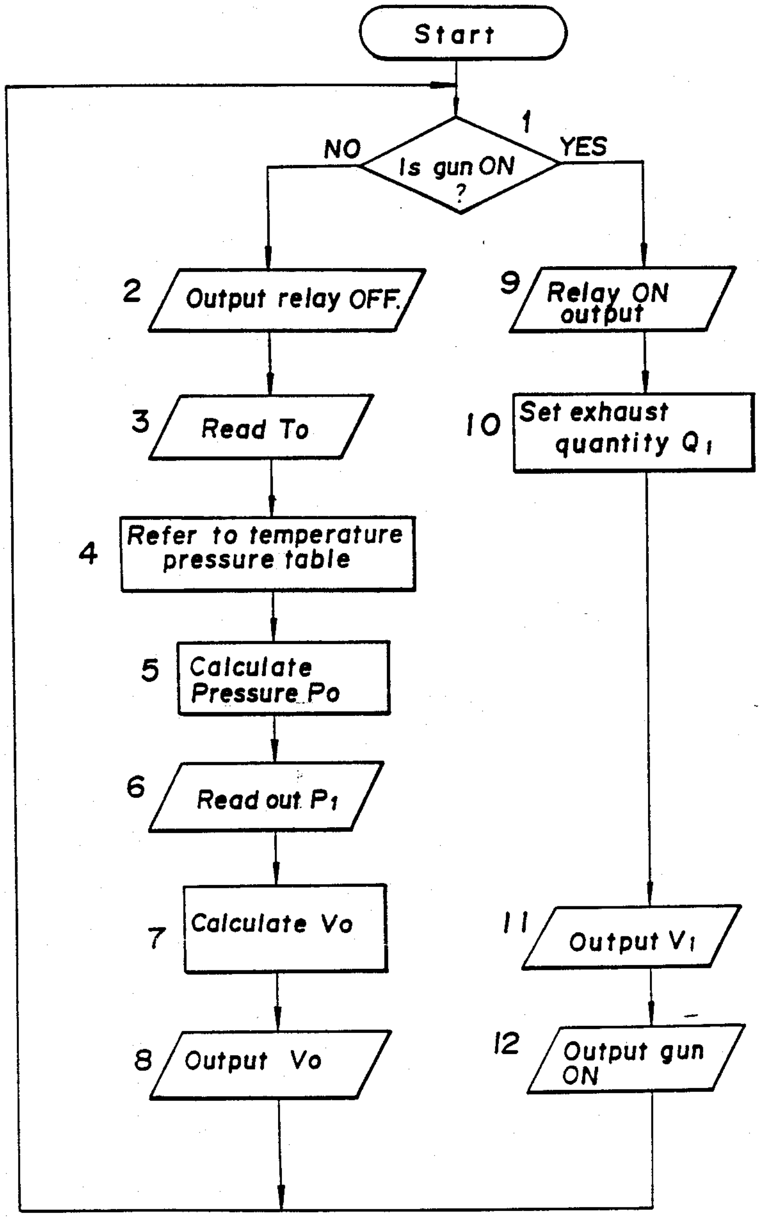
FIG. 3 is a flow chart of the first embodiment of the method according to the present invention.
Figure 4:
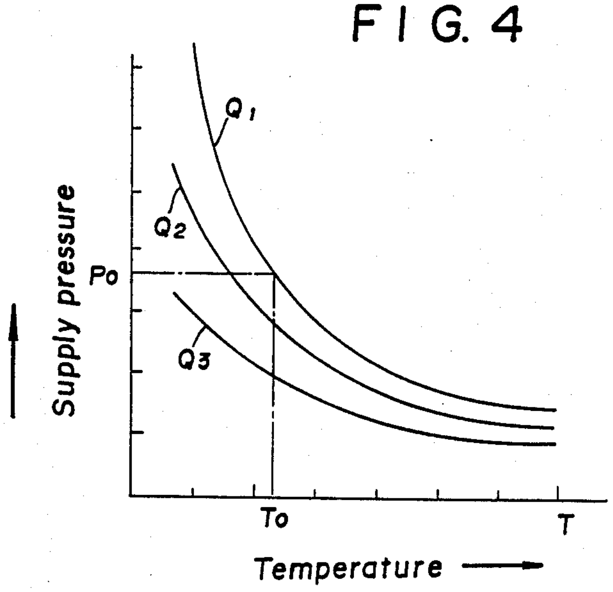
FIG. 4 is a graph showing the temperature-supplying pressure characteristic data of one example employed in the invention.

FIG. 2 shows the construction of the control unit 10. A desired flow rate $Q_1$ and the temperature-supplying pressure characteristic data (FIG. 4) of the sealer are inputted in advance by a setter 103, and stored through a digital input port 104 into a RAM 101. The temperature signal detected by the sensor 11 and the pressure signal detected by the sensor 12 are supplied through wirings 13 and 14 to an A/D converter 105, digitized by the converter 105, and read into a CPU 100. A sequence of operation control shown in the flow chart of FIG. 3 is stored in advance as a program in a ROM 102, and controls input and output with the CPU 100.

A control signal for operating the motor 6 is supplied from the CPU 100 through a D/A converter 106 to a servo amplifier 107 which thus supplies a drive current of the motor 6 to operate the motor 6. The signal from the detector 7 is supplied through a relay 109 to the amplifier 107 to feed back the actual operating speed of the motor 6 to the amplifier 107. The CPU 100 outputs a signal "ON" of the relay 109 and a signal "ON" of the gun 5 to operate the relay 109 and the valve 17 through a digital output port 108.

The operation of the abovementioned embodiment will be described with reference to the flow chart in FIG. 3.

When the power of the apparatus is switched on to start operating the apparatus, the control unit 10 judges whether the gun 5 is ON or OFF (in step 1).

When the gun 5 is not ON, the unit 10 outputs a signal "OFF" to the relay 109 (in step 2). The temperature sensor 11 then reads out the temperature $T_0$ of the sealer in the hose 4 (in step 3). Based on the temperature-supplying pressure characteristic data shown in FIG. 4 stored in the RAM 101 and the detected temperature $T_0$ detected by the temperature sensor 11, the control unit 10 reads out the supplying pressure $P_0$ for providing the desired flow rate $Q_1$ at the detected temperature $T_0$ (in steps 4 and 5). Then, based on the supplying pressure $P_0$ and the fluid pressure $P_1$ detected by the pressure sensor 12 in the hose 4 (in step 6), the control unit 10 obtains the drive signal $V_0$ of the servo motor 6 from an equation $V_0=K(P_0-P_1)$ (where K is a proportional constant) (in step 7). The drive signal $V_0$ is supplied through the converter 106 and the amplifier 107 to the motor 6 (in step 8). Thus, the motor 6 is controlled to produce a drive force for providing the supplying pressure $P_0$, and the pump 3 is operated at the rotating speed for generating the pressure $P_0$. Accordingly, when the gun 5 is OFF, the fluid pressure in the hose 4 is automatically set to the pressure for supplying the fluid at the desired flow rate $Q_1$ at the temperature even if the fluid temperature varies. As a result, the gun 5 can inject the viscous fluid at a predetermined set flow rate $Q_1$ through its nozzle immediately after the gun 5 is switched on, thereby completely eliminating the time delay until reaching to the flow rate $Q_1$ as in the conventional apparatus.

Then, when the gun 5 is switched on, the CPU 100 operates the relay 109 (in step 9), sets a desired flow rate $Q_1$ (in step 10), outputs a speed control signal $V_1$ of the motor 6 for providing the flow rate $Q_1$ to the motor 6 (in step 11), and switches on the gun 5 (in step 12) to operate the pump 3 at a constant rotating speed corresponding to the flow rate $Q_1$. During this constant speed operation, the pump 3 is controlled to feed back by a feedback signal from the detector 7 to continuously supply the sealer to the gun 5 at the constant flow rate $Q_1$. Thus, the gun 5 injects the viscous fluid at the constant flow rate immediately after the gun 5 operates.

According to the above embodiment, even if the viscosity of the viscous fluid varies due to the temperature, stable constant flow rate can be obtained immediately after the gun starts injecting the fluid. Therefore, the accuracy of controlling the flow rate of the apparatus can be remarkably improved.

According to the apparatus described above, the constant flow rate can be obtained immediately after the gun starts injecting the fluid. Thus, when this apparatus is applied to a fluid supplying apparatus of an automatic sealing system, stable sealing quality can be obtained. Further, the apparatus can be applied to an arbitrary viscous fluid having different temperature-viscosity characterized by altering an input of the temperature-supplying pressure characteristic data. Thus, the fluid supplying apparatus having very high universality, compact construction and inexpensive cost can be provided.

Figure 5:
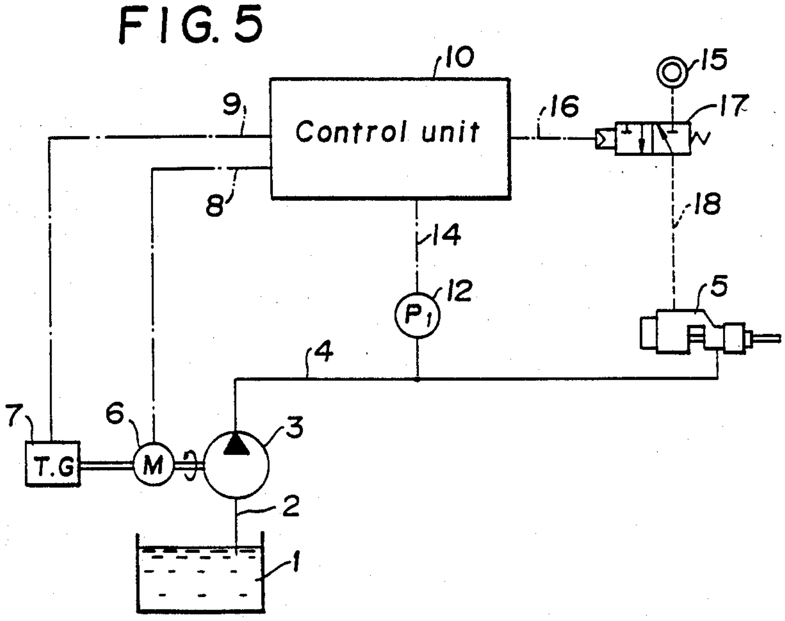
FIG. 5 is a block diagram showing a second embodiment of an apparatus for controlling the flow rate of viscous fluid for executing the method of the present invention.

FIG. 5 shows a second embodiment of an apparatus for controlling the flow rate of viscous fluid according to the present invention. In this apparatus, the temperature sensor for detecting the temperature of the sealer in the hose 4 is removed from the apparatus of the first embodiment described above, and the other construction is the same as that of the first embodiment of the apparatus.

Figure 6:
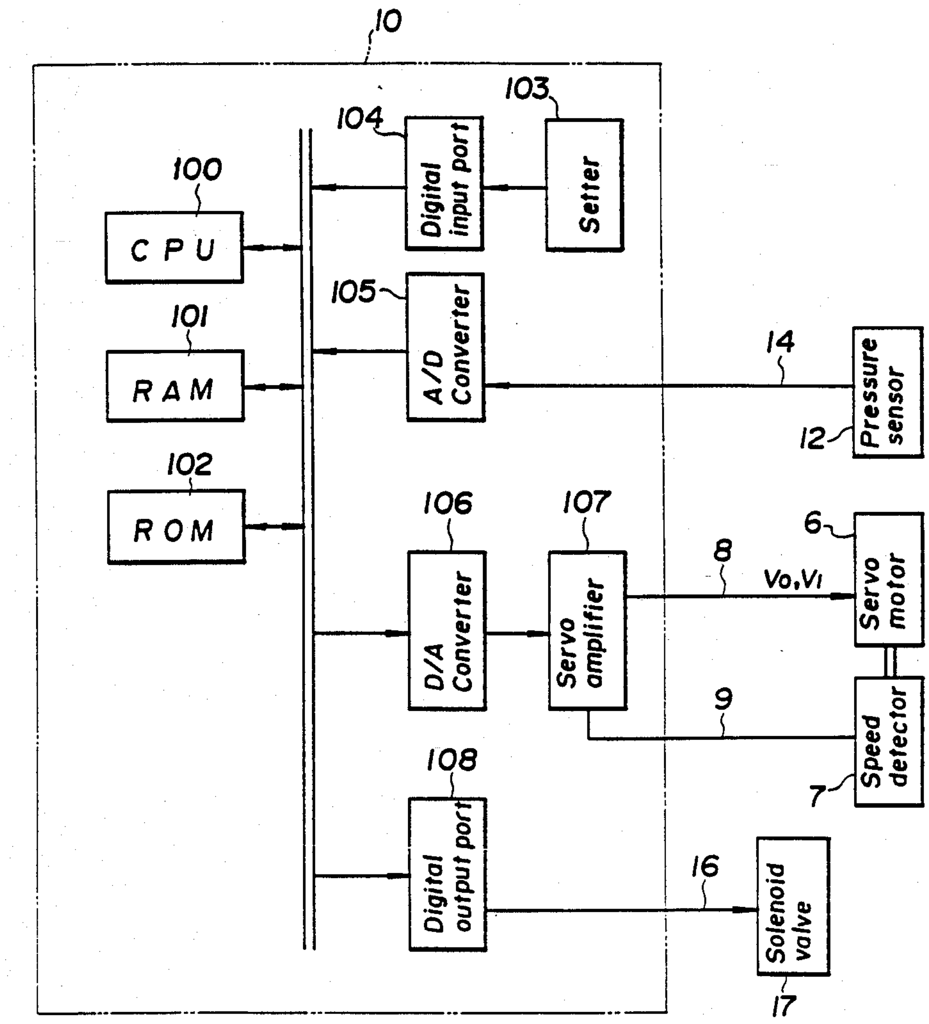
FIG. 6 is a circuit diagram of a control unit in FIG. 5.

FIG. 6 shows the construction of a control unit 10 in the second embodiment of the apparatus in FIG. 5. A desired flow rate $Q_n$ is inputted in advance by a setter 103, and stored through a digital input port 104 into a RAM 101. The pressure signal detected by a pressure sensor 12 is supplied through wirings 14 to an A/D converter 105, digitized by the converter 105, and read into a CPU 100. The pressure signal obtained at a predetermined time after the gun is switched on in a previous operation, is stored in advance in the CPU 100 in response to the exhausting flow rate $Q_n$ as a reference pressure. The predetermined time is time required for stabilizing the pressure of the sealer in the hose 4.

Figure 7:
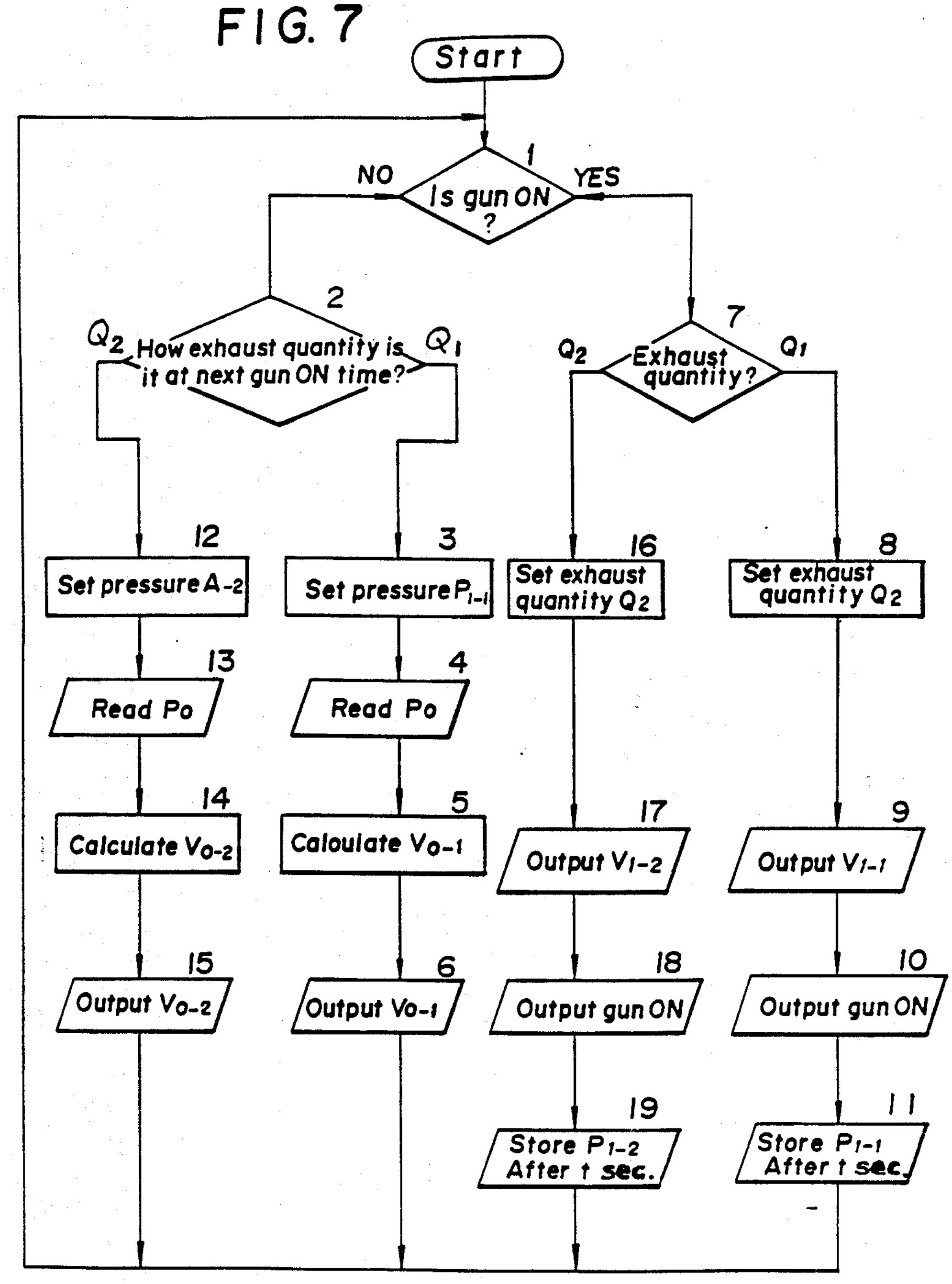
FIG. 7 is a flow chart of the second embodiment of the method according to the present invention.

A sequence of operation control shown in the flow chart of FIG. 7 is stored in advance as a program in a ROM 102, and CPU 100 controls an input and output.

A control signal for operating the motor 6 is supplied from the CPU 100 through a D/A converter 106 to a servo amplifier 107 which thus supplies operating speed command voltages $V_0$, $V_1$ to the motor 6 to operate the motor 6. The detector 7 is connected to the amplifier 107 to feed back the actual operating speed of the motor 6 to the amplifier 107 so that the actual operating speed coincides with a speed corresponding to the operating speed command voltages $V_0$, $V_1$. The CPU 100 outputs signal "ON" of the gun 5 to operate the valve 17 through a digital output port 108.

The operation of the abovementioned second embodiment will be described with reference to the flow chart in FIG. 7.

When the power of a spray device body (not shown) is switched on to start operating the apparatus, the control unit 10 judges whether the ON/OFF command signal of the gun 5 supplied from the spray device body is ON or OFF (in step 1). When the gun 5 is not ON, the unit 10 judges whether the injecting flow rate command signal is $Q_1$ or $Q_2$ (in step 2). The $Q_1$ and $Q_2$ has been inputted in advance with the setter 103. In the CPU 100, a pressure $P_{1\text{-}1}$ has been stored. The pressure $P_{1\text{-}1}$ is a pressure in case of the exhausting flow rate $Q_1$ when the unit operated previously. If the exhausting flow rate is $Q_1$, the unit reads out the pressure $P_{1\text{-}1}$ as a reference pressure (in step 3). A fluid pressure $P_0$ is detected by the pressure sensor 12 in the hose 4 (in step 4). Based on the reference pressure $P_{1\text{-}1}$ and the fluid pressure $P_0$, the drive signal $V_{0\text{-}1}$ of the servo motor 6 is obtained from an equation $V_{0\text{-}1}=K(P_{1\text{-}1})$ (where K is a proportional constant) (in step 5). Then, the drive signal $V_{0\text{-}1}$ is supplied through the converter 106 and the amplifier 107 to the motor 6 (in step 6). Thus, the motor 6 is controlled to have a drive force for providing the supplying pressure $P_{1\text{-}1}$, and the pump 3 is operated to generate the pressure $P_{1\text{-}1}$.

Accordingly, when the gun 5 is OFF, the fluid pressure in the hose 4 is automatically regulated to the stable pressure which is the pressure when the gun 5 was operated previously at the flow rate $Q_1$. As a result, the fluid pressure is regulated to that in response to the variation of the pressure in the hose 4 due to the variation of the temperature of the highly viscous fluid. The gun 5 can inject the viscous fluid at a predetermined set flow rate $Q_1$ through its nozzle immediately after the gun 5 is switched ON, thereby completely eliminating the time delay until reaching to the set flow rate $Q_1$.

Then, when the spray device body is switched on, the CPU 100 judges whether the injecting flow rate is $Q_1$ or $Q_2$ (in step 7). When the flow rate is $Q_1$, the CPU 100 sets a flow rate $Q_1$ (in step 8), outputs an operating speed command voltage $V_{1\text{-}1}$ of the motor 6 to provide the set flow rate $Q_{1\text{-}1}$ to the motor 6 through the servo amplifier 107 (in step 9). The gun 5 is switched on (in step 10) to operate the pump 3 at a constant rotating speed corresponding to the set flow rate $Q_1$. In this constant speed operation, a feedback signal from the detector 7 controls the pump 3 to operate the same at the constant speed, thereby continuously supplying the sealer to the gun 5 in the constant flow rate $Q_1$. Thus, the gun 5 injects the viscous fluid in the constant flow rate immediately after the gun 5 starts injecting the fluid. When the set injecting flow rate is $Q_2$, the gun 5 is controlled by the sequence of steps 12 to 15 similar to the above steps 3 to 6 and the sequence of step 7 to 10 similar to the above steps 8 to 11. Therefore, the injecting flow rate can be obtained in multiple stages, and the gun 5 can inject the fluid in the different flow rates immediately after the gun 5 starts injecting the fluid.

According to the second embodiment of the method of the invention, even if the viscosity of the viscous fluid varies due to the temperature, the constant supplying pressure can be generated to obtain the constant flow rate, and stable constant flow rate can be attained immediately after the gun starts injecting the fluid. Also, the flow rates can be in multiple stages. Therefore, the accuracy of controlling the flow rate of the apparatus can be remarkably improved.

Since the apparatus of the second embodiment of the invention does not require the sequence for detecting the temperature, the sequence can be simplified, and the sequence of forming the temperature-supplying pressure characteristic data and storing the data are not necessary.

The injecting pressure obtained when the gun 5 was previously ON is in advance stored. When the gun 5 is ON at the next time, the fluid pressure is regulated to the stored injecting pressure. Thus, the apparatus can be applied immediately to an arbitrary viscous fluid having different temperature-viscosity characteristics.

According to the apparatus of the second embodiment, the constant flow rate can be obtained immediately after the gun starts injecting the fluid. Thus, when the apparatus is applied to a fluid supply apparatus of an automatic sealing system, stable sealing quality can be obtained. Further, the temperature sensor and the memory means for the sensor are not necessary, thereby simplifying the construction of the apparatus of the embodiment.

What is claimed is:

1. A method of controlling a flow rate of a viscous fluid and for feeding the viscous fluid under pressure from a pump through a hose to a spray gun, the pump being driven by a motor, the method comprising the steps of:

detecting a temperature and a pressure of the viscous fluid in the hose;

calculating a viscous fluid supplying pressure corresponding to a desired flow rate, said viscous fluid supplying pressure being based upon a pre-determined relationship between the desired flow rate, the detected temperature and the viscous fluid supplying pressure;

generating a drive signal based upon the viscous fluid supplying pressure and the detected pressure, the drive signal being supplied to the motor to cause the motor to rotate at a velocity proportional to the drive signal to establish the calculated viscous fluid supplying pressure in the hose;

initiating flow of the viscous fluid through the hose and out the gun; and generating a second drive signal and supplying said second signal to the motor to cause the motor to rotate at a second velocity proportional to the second drive signal to operate the pump at a constant velocity to provide the desired flow rate while the viscous fluid is flowing through the hose and out the gun.

2. A method for controlling a flow rate of a viscous fluid and for feeding the viscous fluid under pressure from a pump though a hose to a spray gun, the method comprising the steps of:

establishing a first pressure signal indicative of the pressure in the hose while viscous fluid is flowing through the hose and out the gun at a desired flow rate and storing the first pressure signal;

turning the gun off;

detecting a pressure of the viscous fluid in the hose;

generating a first drive signal based upon the first pressure signal and the detected pressure, said first drive signal being supplied to the motor to cause the motor to rotate at a velocity proportional to the drive signal to establish the desired pressure in the hose;

initiating flow through the hose and out the gun; and generating a second drive signal and supplying said second signal to the motor to cause the motor to rotate at a second velocity proportional to the second drive signal to operate the pump at a constant speed to provide the desired flow rate while the viscous fluid is flowing through the hose and out the gun updating the first pressure signal after stabilizing the pressure of the viscous fluid in the hose.

3. An apparatus for controlling a flow rate of viscous fluid feeding from a pump through a hose to a spray gun, comprising:

a temperature sensor for detecting a temperature of the fluid in the hose;

a pressure sensor for detecting a pressure of the fluid in the hose;

memory means for storing a pre-determined relationship between the desired flow rate, the detected temperature and the viscous fluid supplying pressure;

calculating means for calculating a viscous fluid supplying pressure to obtain a desired flow rate, said viscous fluid supplying pressure being based upon the pre-determined relationship between the desired flow rate, the detected temperature and the viscous fluid supplying pressure;

means for generating a first drive signal based upon the viscous fluid supplying pressure and the detected pressure, said first drive signal being supplied to the motor to cause the motor to rotate at a velocity proportional to said first drive signal to establish the fluid supplying pressure in the hose;

means for initiating flow through the hose and out the gun; and means for generating a second drive signal and supplying said second drive signal to the motor to cause the motor to rotate at a second velocity proportional to said second drive signal to operate the pump at a constant speed to provide the desired flow rate while the viscous fluid is flowing through the hose and out the gun.

4. An apparatus for controlling a flow rate of viscous fluid feeding from a pump through a hose to a spray gun, comprising:

a pressure sensor for detecting a pressure of the viscous fluid in the hose;

memory means for storing a pressure detected by the sensor;

means for generating a first drive signal based upon the detected pressure signal and the detected pressure, said first drive signal being supplied to the motor to cause the motor to rotate at a velocity proportional to the drive signal to establish the desired pressure in the hose;

means for initiating flow through the hose and out the gun; and means for generating a second drive signal and supplying said second drive signal to the motor to cause the motor to rotate at a second velocity proportional to said second drive signal to operate the pump at a constant speed to provide the desired flow rate while the gun is on.

* * * * *